INVENTOR.
RINALDO SALTO
BY John Toggenburger
AGENT

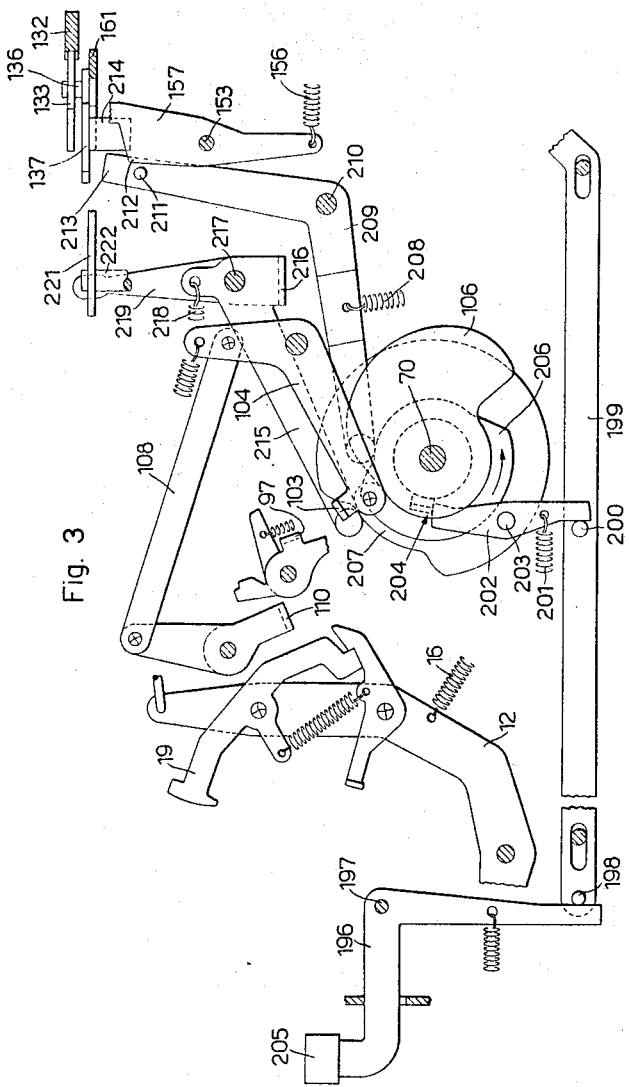

United States Patent Office 3,288,262
Patented Nov. 29, 1966

3,288,262
VARIABLE SPACING MECHANISM FOR TYPE-
WRITERS AND LIKE MACHINES
Rinaldo Salto, Ivrea, Italy, assignor to Ing. C. Olivetti &
C., S.p.A., Ivrea, Italy, a corporation of Italy
Filed Nov. 4, 1963, Ser. No. 321,221
Claims priority, application Italy, Nov. 8, 1962,
22,020/62
12 Claims. (Cl. 197—84)

This invention relates to a variable spacing mechanism for typewriters and like machines comprising a toothed escapement member urged in an advancing direction and normally engaged by movable dog means disengageable therefrom and variably movable in a retrograde direction, retaining dog means engageable with said escapement member, and universal means operable for alternating said retaining dog means with said movable dog means in the engagement with said escapement member.

In the known spacing mechanisms the movable dog must be moved before or after the advancement of the escapement member through a retrograde stroke substantially equal to said advancement. Said stroke requires thus a long time and the typewriter cannot be operated at a high speed.

The primary object of the invention is to provide a variable spacing mechanism wherein the time required for its operation is greatly reduced with respect to the time required by the known mechanisms.

Another object is to provide a spacing mechanism wherein the retrograde stroke of the movable dog means is reduced.

Still another object is to provide a spacing mechanism causing the carriage to be moved smoothly.

A further object is to provide a spacing mechanism wherein the movable dog means are adapted to back space the carriage.

A further object is to provide a variable spacing mechanism adapted to cause the carriage to advance through a constant stroke in the case of simultaneous depression of more than one printing key.

With the above objects in view, in a variable spacing mechanism for typewriters and like machines, I now provide the combination of a toothed escapement member urged in an advancing direction, movable dog means normally engaged with said escapement member against said urge, means mounting said movable dog means for engagement with and disengagement from said escapement member, means for variably moving said movable dog means in a retrograde direction when disengaged from said escapement member, retaining dog means for said escapement member, means mounting said retaining dog means for engagement with and disengagement from said escapement member, said retaining dog means being normally disengaged from said escapement member, universal means operable for alternating said movable dog means and said retaining dog means in the engagement with said escapement member, means for moving said retaining dog means in said advancing direction when engaging said escapement member, and means for mutually arresting said movable dog means and said retaining dog means against each other upon operation of said universal means, whereby said escapement member is caused to advance through a spacing corresponding to the sum of the retrograde movement of said movable dog means and of the advancing movement of said retaining dog means.

Other objects, features and advantages of the invention will become apparent from the following description of a preferred embodiment thereof, taken in conjunction with the accompanying drawings, wherein:

FIG. 3 is a right hand longitudinal sectional view of a detail of FIG. 2.

The variable spacing device of the invention is embodied in a power operated typewriter, substantially of the kind described in the applicant's copending United States patent application Serial No. 311,709 filed on September 26, 1963, now Patent No. 3,151,722, and it will now be shortly described.

Figure 1:
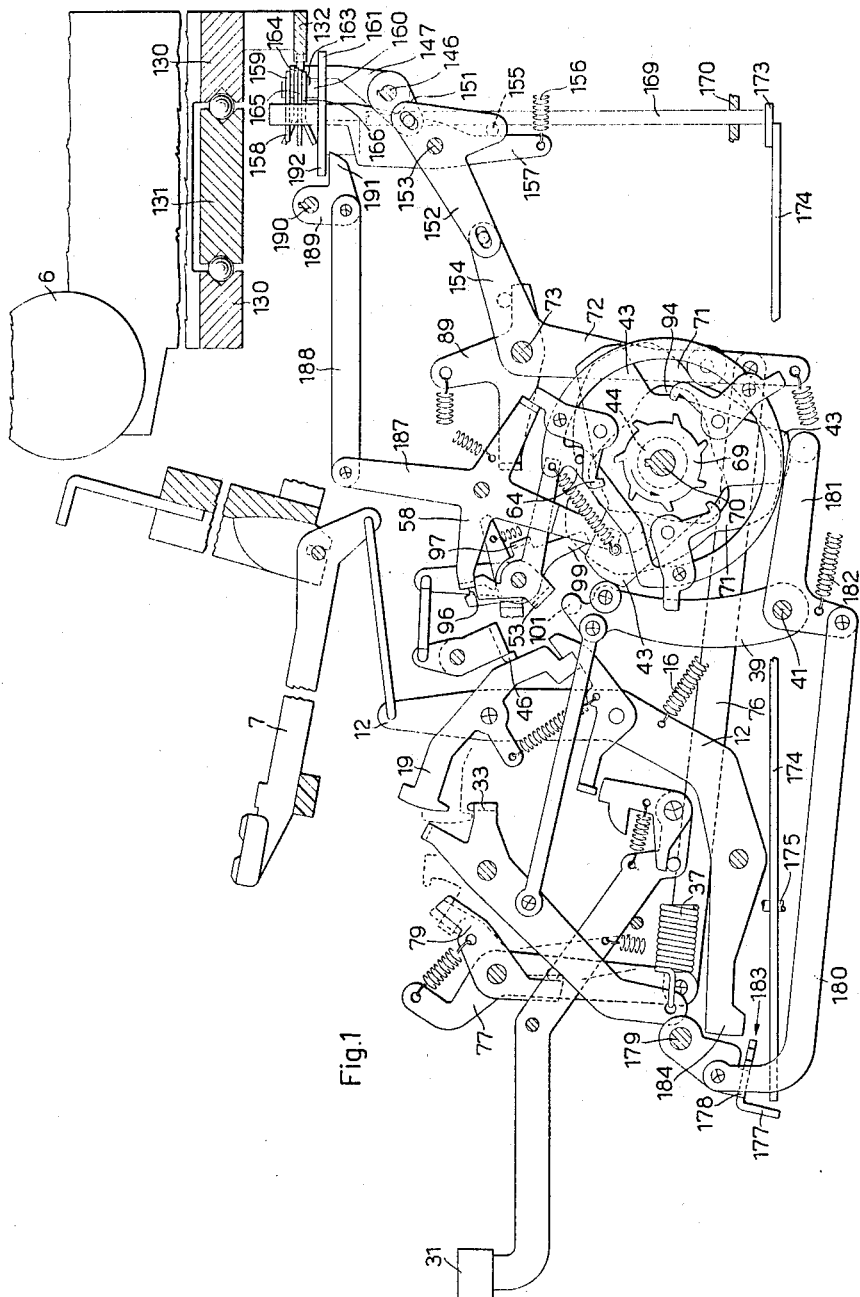
FIG. 1 is a right hand longitudinal sectional partial view of a typewriter embodying a variable spacing mechanism according to the invention.

With reference to FIG. 1, at the depression of a printing key 31 an interponent 19 of an associated type action is released and is rocked counterclockwise. The interponent 19 on one hand through a universal bar 46, a bail 53 and a lever 58, engages a clutch 64, 69, thus causing a cyclically operating mechanism comprising a hub 44 to be rotated for a cycle of 120 degrees by a continuously rotating shaft 70. On the other hand the rocked interponent 19 is coupled with a common actuator or bar 33 connected to a lever 39 urged by a spring 37 to contact a cam 43 secured to the hub 44.

At the beginning of the cycle of the hub 44, the cam 43 causes the bar 33 to be rocked counterclockwise by the spring 37. The bar 33 through the interponent 19 rocks counterclockwise a lever 12 rockably mounting the interponent 19, whereby a corresponding type bar 7 is rocked clockwise toward a conventional platen 6 against the action of a spring 16 attached to the lever 12. Subsequently the cam 43 through the lever 39 restores the bar 33, while the lever 12 and the type bar 7 are restored by a proper spring. It is to be noted that, due to the descending edge of the lobes of the cam 43, the spring 37 freely rocks the bar 33 counterclockwise.

During the cycle of the hub 44, a second cam 71 secured thereto rocks counterclockwise a lever 72 pivoted on a stationary shaft 73. The lever 72 causes a lever 89 to restore the bail 53 together with the universal bar 46. A third cam 94 secured to the hub 44 rocks clockwise the lever 58, which is now temporarily locked in the rocked position by a shoulder 96 of a bail 97. The lever 58 is released by the shoulder 96 to contact the bail 53 as shown in FIG. 1, only in the case the lever 39 is fully rocked clockwise and engages with a pin 101 an arm 99 of the bail 97.

If accidentally two or more keys 31 are simultaneously depressed, the spring 37, due to the load of two or more springs 16 to overcome, begins to rock the bar 33 counterclockwise at a reduced speed. Therefore the bar 33 before the end of its stroke is arrested by a pawl 79 yieldably rocked at a constant speed by a lever 77 linked through a link 76 to the lever 72. In this case the lever 39 is partially rocked clockwise and the pin 101 does not reach the arm 99 of the bail 97, whereby the lever 58 remains locked by the shoulder 96. Now the clutch 64, 69 cannot be engaged by the depression of the printing key 31, which merely rocks the bail 53, whereby the typewriter remains locked. The typewriter may be released by depressing a special typewriter releasing key not shown in the drawings, which is adapted to operate a lever 202 fulcrumed on a stationary pivot 203 so as to engage a clucth 204 (FIG. 3) to rotate one revolution a cam 106. Then the cam 106 rocks a lever 104 clockwise, whereby a lug 103 thereof restores the bail 97 counterclockwise thus causing the lug 57 (FIG. 1) to contact again the bail 53, while the bail 110 linked with the lever 104 through a link 108 uncouples the coupled interponents 19 from the bar 33, as it is described in detail in the above cited applicant's copending patent application Serial No. 311,709.

The platen 6 is carried by a conventional paper carriage comprising a pair of transverse grooved bars 130 slidable on a stationary rail 131. Secured to the rearward bar 130 is a toothed escapement member or rack 132 (FIG. 2) having teeth spaced apart a plurality of three unit intervals of spacing and being urged in an advancing direction shown by the arrow 231 in FIG. 2, by moving means formed of a spring 232.

Normally engaged with the rack 132 are movable dog means formed of a plurality of three movable dogs 133, 134 and 135, each one fulcrumed on a corresponding pin 136 secured to a first support or slide 137 and urged counterclockwise by a corresponding spring 138. The three movable dogs 133, 134 and 135 are mutually offset by whole units of spacing, whereby the rack 132 with one of its teeth transversely contacts always one of said movable dogs (in FIG. 2 the dog 133). The slide 137 is slidable on two stationary pins 139 and 140 and is urged by a spring 141 in a retrograde direction (rightwards in FIG. 2). The slide 137 is provided with a projection 142 normally latched by a latch 143 pivoted at 144 and urged counterclockwise by a spring 145. Since the action of carriage spring urging the rack 132 leftwards prevails on the spring 141, the slide 137 is normally displaced leftwards and contacts the pin 139.

Figure 2:
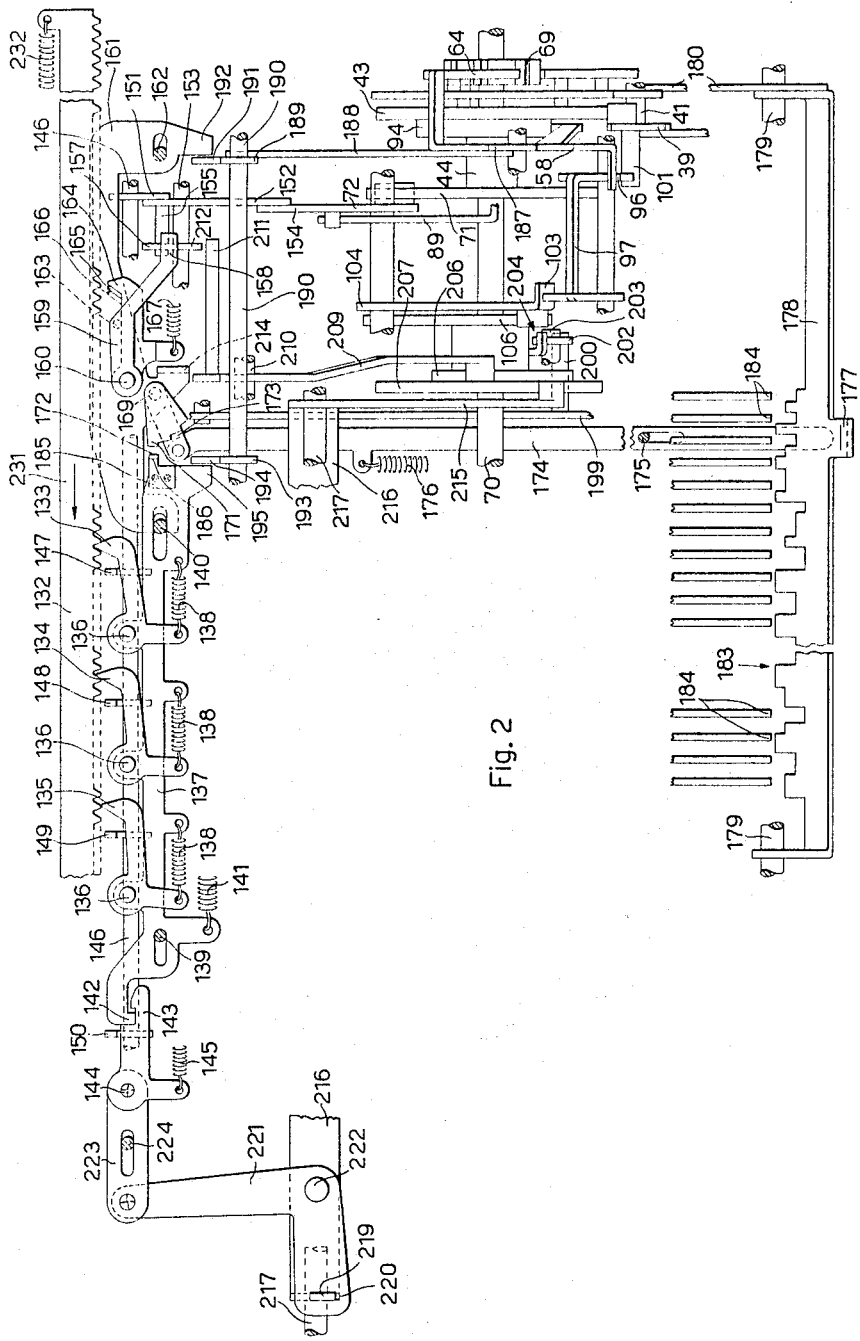
FIG. 2 is a partial plan view of FIG. 1.

The spacing mechanism comprises retaining dog means formed of a plurality of three retaining dogs 164, 165 and 166 mutually offset by one unit of spacing and fulcrumed on a common pivot 160 for engagement with and disengagement from the rack 132. The pivot 160 is secured to a second support or slide 161 slidably mounted on the pin 140 and on a second stationary pin 162. Each one of the three retaining dogs 164, 165 and 166 is urged by a corresponding spring 167 to contact a pin 163 of a lever 159 fulcrumed on the pivot 160. A projection 158 of the lever 159 contacts an upper arm of a lever 157 (FIG. 1) pivoted at 153 and urged counterclockwise by a spring 156, whose action prevails on the three springs 167 (FIG. 2). Therefore the retaining dogs 164, 165 and 166 are normally held disengaged from the rack 132. However the springs 167 through the dogs 164, 165 and 166 normally urge the slide 161 rightwards to contact the pin 162.

Furthermore, the spacing mechanism comprises universal means operable for alternating the movable dogs 133, 134 and 135 and the retaining dogs 164, 165 and 166 in the engagement with the rack 132. More particularly, said universal means comprise a lever 152 (FIG. 1) fulcrumed at 153 and pin-and-slot connected to an arm 154 of the lever 72. The lever 152 on one hand is pin-and-slot connected with an arm 151 secured to a shaft 146 rockably mounted on the machine frame. Secured to the shaft 146 are three similar arms 147, 148 and 149 (FIG. 2) adapted to cooperate with the three movable dogs, and another similar arm 150 adapted to cooperate with the latch 143. On the other hand the lever 152 (FIG. 1) is provided with a pin 155 normally contacted by the lever 157 under the urge of the spring 156.

Means are provided for mutually arresting the movable dogs and the retaining dogs against each other upon operation of the universal means 152. Said means comprise a stepped element or sector 171 (FIG. 2) having four steps adapted to cooperate with an arresting element formed of a projection 172 of the slide 137. The sector 171 is secured to the upper end of a vertical shaft 169 (FIG. 1) rockably mounted on a portion 170 of the machine frame. The shaft 169 near the sector 171 is rockably mounted on the slide 161 (FIG. 2) with such a clearance as to be moved transversely therewith.

Secured to the lower end of the shaft 169 (FIG. 1) is an arm 173 linked to a longitudinal slide 174 urged forward by a spring 176 (FIG. 2) to contact a stationary pin 175. The forward end of the slide 174 is adapted to be engaged by a lug 177 (FIG. 1) of a bail 178 fulcrumed on a shaft 179 and connected through a link 180 to a lever 181 pivoted at 41 and urged by a spring 182 to contact the cam 43. The bail 178 is provided with a sensing member of comb 183 (FIG. 2) adapted to sense a number of presettable elements associated to the printing keys 31. More particularly, each one of said presettable elements is formed of a projection 184 (FIG. 1) of each lever 12 and is presettable on the path of the comb 183. This comb 183 (FIG. 2) is provided with a number of teeth associated with the projections 184 and each one having a length proportional to the width of the character of the corresponding type bar 7. Particularly the teeth of the comb 183 are of four different lengths to select a carriage advancement of two, three, four and five units of spacing respectively.

The variable spacing mechanism operates as follows.

At the depression of a printing key 31 (FIG. 1) the corresponding lever 12, when rocked counterclockwise by the bar 33, displaces its projection 184 downwards on the path of the comb 183. Thereafter the cam 43 causes the lever 181 to be rocked counterclockwise by the spring 182. The link 180 thus rocks counterclockwise the bail 178, whereby the comb 183 senses the displaced projection 184 and is variably arrested according to the width of the character of the corresponding type bar 7. The lug 177 of the bail 178 engages the forward end of the slide 174 and, since the action of the spring 182 prevails on the action of the spring 176 (FIG. 2), the slide 174 is moved rearwards and rocks the arm 173 together with the shaft 169 and the sector 171 through a corresponding angle. The sector 171 locates thus a corresponding step in front of the projection 172 of the slide 137, thus selecting the units of spacing to be effected by the carriage.

Now the cam 71 (FIG. 1) through the lever 72 rocks the lever 152 clockwise. The pin 155 of the lever 152 rocks clockwise the lever 157, which releases the projection 158 of the lever 159 (FIG. 2), whereby the springs 167 cause the retaining dogs 164, 165 and 166 to engage the rack 132. Furthermore, the lever 152 (FIG. 1) rocks counterclockwise the arm 151 together with the shaft 146. The three similar arms 147, 148, 149 (FIG. 2) disengage now the movable dogs 133, 134 and 135 from the rack 132, while the arm 150 rocks clockwise the latch 143 to unlatch the projection 142 of the slide 137.

The paper carriage is now moved leftwards by its spring together with the rack 132 which contacts transversely one of the retaining dogs 164, 165 and 166. Since these dogs are mounted on the slide 161, the rack 132 is not arrested by the retaining dogs, but moves leftwards the dogs 164, 165 and 166 together with the slide 161 and with the sector 171. Simultaneously the slide 137 together with the movable dogs 133, 134 and 135 is moved by the spring 141 rightwards towards the slide 161. When the projection 172 encounters the sector 171, the slides 137 and 161 are mutually arrested.

Thereafter the cam 71 (FIG. 1) causes the levers 72 and 152 to be restored, whereby the arms 147, 148 and 149 (FIG. 2) release the movable dogs 133, 134 and 135 which by the urge of their springs 138 reengage the rack 132, while the arm 150 releases the latch 143. The spring 156 (FIG. 1) in turn, through the levers 157 and 159 disengages the retaining dogs 164, 165 and 166 (FIG. 2) from the rack 132, which now moves the movable dogs 133, 134 and 135 leftwards until the slide 137 is arrested by the pin 139. The projection 142 of the slide 137 is thus relatched by the latch 143, whereas the springs 167 restore the slide 161 rightwards to contact the pin 162.

It will be clear that, upon the operation of the universal means 152, the means 171, 172 mutually arrest the movable dog means 133, 134 and 135 and the retaining dog means 164, 165 and 166 against each other, whereby the escapement member 132 is caused to advance through a spacing corresponding to the sum of the retrograde or rightward movement of the movable dog means and of the advancing or leftward movement of the retaining dog means. The spacing of the rack 132 depends in any case to the step of the sector 171 encountered by the projection 172 (FIG. 2). Particularly beginning from the highest step of the sector 171, the rack 132 will effect two, three, four or five units of spacing.

Furthermore, it will be clear that, due to the movement of the slide 161 toward the slide 137, on one hand the retrograde stroke of the movable dogs 133, 134 and 135 with respect to the spacing to be effected by the rack 132 is reduced, thus increasing the speed of the machine, on the other hand the intermediate shock of the rack 132 against the retaining dogs is eliminated, whereby the movement of the carriage is effected smoothly.

Finally, since the sector 171 is transversely moved bodily with the slide 161 and the retaining dogs 164, 165 and 166, after the projection 172 has encountered the sector 171, the position of the slide 137 at the instant of the engagement of the rack 132 by the movable dogs 133, 134 and 135 has no effect on the spacing, because the relative position of the slide 137 with respect to the rack 132 does not change. Even the instant of said engagement has no effect on the spacing, because after the projection 172 has encountered the sector 171, the slide 137 is moved leftwards by the sector 171, remaining in the same relative position with the rack 132.

Since the spacing of a lower case character may be different from the spacing of the corresponding upper case character, the bail 178 is transversely shiftable in a known manner at the depression of the conventional case shift key, whereby the comb 183 will sense the projection 184 by means of a different set of teeth.

It is desired for certain kinds of typewritten matter to write the characters with slightly increased spacing. To this end a plate 185 is secured to the slide 137 and is provided with a projection 186 spaced apart one unit of spacing from the projection 172. The projection 186 can substitute the projection 172 in encountering the sector 171 by suitably shifting the sector 171 and the shaft 169 vertically in a known manner.

It has been disclosed as in the case two or more printing keys 31 (FIG. 1) are simultaneously depressed, on one hand the bar 33 is arrested before the end of its stroke, on the other hand the lever 58 remains locked in a position rocked clockwise by the shoulder 96 of the bail 97. Since in this case the lever 72 through the lever 152 operates the spacing mechanism, the paper carriage should advance according to the spacing required by the largest one of the characters whose keys have been depressed.

However, the spacing mechanism is provided with means responsive to the simultaneously depression of more than one printing key for arresting the movable dogs and the retaining dogs in a predetermined position irrespective of the depressed keys. More particularly, said responsive means comprise a projection 191 of a first arm 189 adapted to cooperate with a projection 192 (FIG. 2) of the slide 161, and a projection 194 of a second arm 193 adapted to cooperate with a projection 195 of the slide 137. The arms 189 and 192 are secured to a shaft 190 rockably mounted on the machine frame, the arm 189 (FIG. 1) being further linked through a link 188 to an arm 187 of the lever 58.

When the lever 58 is rocked clockwise, the link 188 rocks counterclockwise the arm 189, together with the shaft 190 and the arm 193 (FIG. 2), whereby the projections 191 and 194 are located on the path of the projections 192, and 195 respectively. If the lever 58 remains locked by the shoulder 96, on one hand the projection 191 of the arm 189 arrests the projection 192, thus preventing the slide 161 and the retaining dogs 164, 165 and 166 from being moved leftwards, on the other hand the projection 194 of the arm 193 arrests the projection 195, thus preventing the slide 137 and the movable dogs 133, 134 and 135 from being moved rightwards. The carriage advances now only one unit of spacing, which substantially corresponds to the sum of clearance between the projections 191 and 192 and of clearance between the projections 194 and 195.

The movable dogs 133, 134 and 135 are adapted to be moved in the retrograde or rightward direction when engaging the escapement member 132 to back space the carriage. To this end the pivot 144 of the latch 143 is secured to a slide 223 slidably mounted on a stationary pin 224 and connected to a lever 221 pivoted at 222. The lever 221 is provided with a slot 220 entered by an arm 219 of a bail 216 (FIG. 3) pivoted at 217. Another arm 215 of the bail 216 cooperates by the urge of a spring 218 with a cam 207 bodily rotatable with the cam 106. The lever 202 is urged by a spring 201 to contact a pin 200 of a horizontal slide 199. Another pin 198 of the slide 199 normally contacts a lever 196 pivoted at 197 and provided with a conventional back space key 205.

A second cam 206 bodily movable with the cam 207 cooperates with a lever 209 pivoted at 210 and urged counterclockwise by a spring 208. A pin 211 of the lever 209 is adapted to cooperate with a shoulder 212 of the lever 157, whereas a projection 213 of the lever 209 is adapted to cooperate with a bent lug 214 of the slide 161 (FIG. 2).

At the depression of the back space key 205 (FIG. 3) the lever 196 is rocked counterclockwise and through the pin 198 moves the slide 199 rearwards. The pin 200 rocks now the lever 202 counterclockwise, causing thus the engagement of the clutch 204, whereby the cams 206 and 207 are rotated counterclockwise for a back space cycle. At the beginning of the cycle the cam 207 rocks the bail 216 clockwise. The arm 219 of the bail 216 rocks the lever 221 clockwise (FIG. 2), thus moving the slide 223 rightwards together with the latch 143. The slide 137 is thus pushed by the latch 143 and moves the movable dogs 133, 134 and 135 rightwards. Since the movable dogs are engaging the rack 132, this latter is moved rightwards together with the paper carriage through a stroke slightly longer than one unit of spacing.

Thereafter the cam 206 (FIG. 3) rocks the lever 209 clockwise. The pin 211 of the lever 209 rocks the lever 157 which releases the lever 159 (FIG. 2), whereby the retaining dogs 164, 165 and 166 are caused to temporarily engage the rack 132. Simultaneously the lever 209 locates its projection 213 (FIG. 3) on the path of the lug 214 of the slide 161, which is thus prevented from being moved leftwards.

Near the end of the cycle, the cam 207 causes the bail 216 to be restored by the spring 218 whose action prevails on the action of the spring 141 (FIG. 2). Therefore the spring 218, through the lever 221, the slide 223 and the latch 143, restores leftwards the slide 137, whereby the movable dogs 133, 134 and 135 are caused to engage the rack 132 in a position back spaced one unit of spacing. Finally the cam 206 (FIG. 3) causes the lever 209 to be restored together with the lever 157, thus disengaging the retaining dogs 164, 165 and 166 (FIG. 2) from the rack 132, which is now arrested by the movable dogs 133, 134 and 135.

It is to be noted that in the case the lever 58 (FIG. 1) remains locked by the shoulder 96 in response to the simultaneous depression of more than one printing key, the above cited typewriter release key by engaging the clutch 204 (FIG. 3) effects a back spacing operation simultaneously with the typewriter releasing operation. The spacing effected by the carriage in response to the simultaneous depression of more than one printing key is thus eliminated by the back space controlled by the typewriter release key. It is obvious that the key 205 provided as back space key, is also adapted to act as a typewriter release key.

In the above embodiment the escapement member is formed of a rack 132 having teeth spaced apart three units of spacing and cooperating with three movable dogs and three retaining dogs. It will be obvious that the rack may be toothed according to the unit of spacing to cooperate with a single movable dog and a single retaining dog. Furthermore, the rack may be substituted by a conventional escapement ratchet wheel and the supports 137 and 161 may be pivotally mounted on the axis of the wheel instead of being slidably mounted.

What I claim is:

1. In a variable spacing mechanism for typwriters and like machines, the combination comprising:
   (a) a toothed escapement member urged in an advancing direction,
   (b) movable dog means normally engaged with said escapement member against said urge,
   (c) means mounting said movable dog means for engagement with and disengagement for said escapement member,
   (d) means for variably moving said movable dog means in a retrograde direction when disengaged from said escapement member,
   (e) retaining dog means for said escapement member,
   (f) means mounting said retaining dog means for engagement with and disengagement from said escapement member, said retaining dog means being normally disengaged from said escapement member,
   (g) universal means operable for alternating said movable dog means and said retaining dog means in the engagement with said escapement member,
   (h) means for moving said retaining dog means in said advancing direction when engaging said escapement member,
   (i) and means for mutually arresting said movable dog means and said retaining dog means against each other upon operation of said universal means, whereby said escapement member is caused to advance through a spacing corresponding to the sum of the retrograde movement of said movable dog means and of the advancing movement of said retaining dog means.

2. In a variable spacing mechanism for typewriters and like machines, the combination comprising:
   (a) a toothed escapement member urged in an advancing direction,
   (b) movable dog means normally engaged with said escapement member against said urge,
   (c) means mounting said movable dog means for engagement with and disengagement from said escapement member,
   (d) means for variably moving said movable dog means in a retrograde direction when disengaged from said escapement member,
   (e) retaining dog means for said escapement member,
   (f) means mounting said retaining dog means for engagement with and disengagement from said escapement member, said retaining dog means being normally disengaged from said escapement member,
   (g) universal means operable for alternating said movable dog means and said retaining dog means in the engagement with said escapement member,
   (h) means for moving said retaining dog means in said advancing direction when engaging said escapement member,
   (i) and means connected to said movable dog means and said retaining dog means for mutually arresting same upon operation of said universal means, whereby said escapement member is caused to advance through a spacing corresponding to the sum of the retrograde movement of said movable dog means and of the advancing movement of said retaining dog means.

3. In a variable spacing mechanism for typewriters and like machines, the combination comprising:
   (a) an escapement member having teeth spaced apart a plurality of unit intervals of spacing and being urged in an advancing direction,
   (b) a plurality of movable dogs normally engaged with said escapement member against said urge,
   (c) a first support for mounting said movable dogs for engagement with and disengagement from said escapement member,
   (d) means for variably moving said support in a retrograde direction when said movable dogs are disengaged from said escapement member,
   (e) a plurality of retaining dogs for said escapement member,
   (f) a second support for mounting said retaining dogs for engagement with and disengagement from said escapement member, said retaining dogs being normally disengaged from said escapement member,
   (g) universal means operable for alternating said movable dogs and said retaining dogs in the engagement with said escapement member,
   (h) means for moving said second support in said advancing direction when said retaining dogs engage said escapement member,
   (i) and means connected to said first and second support for mutually arresting same upon operation of said universal means, whereby said escapement member is caused to advance through a spacing corresponding to the sum of the retrograde movement of said first support and of the advancing movement of said second support.

4. In a variable spacing mechanism for typewriters and like machines, the combination comprising:
   (a) an escapement member having teeth spaced apart a plurality of unit intervals of spacing and urged in an advancing direction,
   (b) a plurality of movable dogs normally engaged with said escapement member against said urge,
   (c) a first support for mounting said movable dogs for engagement with and disengagement from said escapement member,
   (d) means for variably moving said support in a retrograde direction when said movable dogs are disengaged from said escapement member,
   (e) a plurality of retaining dogs for said escapement member,
   (f) a second support for mounting said retaining dogs for engagement with and disengagement from said escapement member, said retaining dogs being normally disengaged from said escapement member,
   (g) universal means operable for alternating said movable dogs and said retaining dogs in the engagement with escapement member,
   (h) means for moving said second support in said advancing direction when said retaining dogs engage said escapement member,
   (i) a stepped element connected to one of said supports,
   (j) an arresting element connected to the other one of said supports for cooperating with said stepped element as to mutually arrest said supports upon operation of said universal means, whereby said escapement member is caused to advance through a spacing corresponding to the sum of the retrograde movement of said first support and of the advancing movement of said second support,
   (k) and means for variably setting one of said element with respect to the other element.

5. In a variable spacing mechanism for typewriters and like machines, the combination comprising:
   (a) an escapement member having teeth spaced apart a plurality of unit intervals of spacing and being urged in an advancing direction,
   (b) a plurality of movable dogs normally engaged with said escapement member against said urge,
   (c) a first support for mounting said movable dogs for engagement with and disengagement from said escapement member,
   (d) means for variably moving said support in a retrograde direction when said movable dogs are disengaged from said escapement member, (e) a plurality of retaining dogs for said escapement member,
(f) a second support for mounting said retaining dogs for engagement with and disengagement from said escapement member, said retaining dogs being normally disengaged from said escapement member,
(g) universal means operable for alternating said movable dogs and said retaining dogs in the engagement with said escapement member,
(h) means for moving said second support in said advancing direction when said retaining dogs engage said escapement member,
(i) a variably settable stepped element,
(j) an elongated member having a portion secured to said element and mounted on said second support as to be moved therewith, another portion of said elongated member being operable for variably setting said stepped element,
(k) and an arresting element connected to said first support for cooperating with said stepped element as to mutually arrest said supports upon operation of said universal means, whereby said escapement member is caused to advance through a spacing corresponding to the sum of the retrograde movement of said first support and of the advancing movement of said second support.

6. In a variable spacing mechanism for typewriters and like machines, the combination comprising:
(a) an escapement member having teeth spaced apart a plurality of unit intervals of spacing and being urged in an advancing direction,
(b) a plurality of movable dogs normally engaged with said escapement member against said urge,
(c) a first support for mounting said movable dogs for engagement with and disengagement from said escapement member,
(d) means for variably moving said support in a retrograde direction when said movable dogs are disengaged from said escapement member,
(e) a plurality of retaining dogs for said escapement member,
(f) a second support for mounting said retaining dogs for engagement with and disengagement from said escapement member, said retaining dogs being normally disengaged from said escapement member,
(g) universal means operable for alternating said movable dogs and said retaining dogs in the engagement with said escapement member,
(h) means for moving said second support in said advancing direction when said retaining dogs engage said escapement member,
(i) a variably settable stepped element,
(j) an elongated member having a portion secured to said element and mounted on said second support as to be moved therewith, another portion of said elongated member being operable for variably setting said stepped element,
(k) a number of elements each one presettable at the depression of an associated printing key,
(l) a sensing member adapted to sense the preset element of said number for accordingly operating said other portion,
(m) and an arresting element connected to said first support for cooperating with said stepped element as to mutually arrest said supports upon operation of said universal means, whereby said escapement member is caused to advance through a spacing corresponding to the sum of the retrograde movement of said first support and of the advancing movement of said second support.

7. In a variable spacing mechanism for typewriters and like machines, the combination comprising:
(a) a toothed escapement member urged in an advancing direction,
(b) movable dog means normally engaged with said escapement member against said urge,
(c) means mounting said movable dog means for engagement with and disengagement from said escapement member,
(d) means conditionable for variably moving said movable dog means in a retrograde direction when disengaged from said escapement member,
(e) a number of elements each one presettable at the depression of an associated printing key for accordingly conditioning said conditionable means,
(f) retaining dog means for said escapement member,
(g) means mounting said retaining dog means for engagement with and disengagement from said escapement member, said retaining dog means being normally disengaged from said escapement member,
(h) universal means operable for alternating said movable dog means and said retaining dog means in the engagement with said escapement member,
(i) means for moving said retaining dog means in said advancing direction when engaging said escapement member,
(j) means for mutually arresting said movable dog means and said retaining dog means against each other upon operation of said universal means, whereby said escapement member is caused to advance through a spacing corresponding to the sum of the retrograde movement of said movable dog means and of the advancing movement of said retaining dog means,
(k) and means responsive to the simultaneous depression of more than one printing key for arresting said movable dog means and said retaining dog means in predetermined positions irrespective of the preset elements of said number, whereby said escapement member is caused to advance through a constant stroke.

8. In a variable spacing mechanism for typewriters and like machines, the combination comprising:
(a) an escapement member having teeth spaced apart a plurality of unit intervals of spacing and being urged in an advancing direction,
(b) a plurality of movable dogs normally engaged with said escapement member against said urge,
(c) a first support for mounting said movable dogs for engagement with and disengagement from said escapement member,
(d) means for variably moving said support in a retrograde direction when said movable dogs are disengaged from said escapement member,
(e) a plurality of retaining dogs for said escapement member,
(f) a second support for mounting said retaining dogs for engagement with and disengagement from said escapement member, said retaining dogs being normally disengaged from said escapement member,
(g) universal means operable for alternating said movable dogs and said retaining dogs in the engagement with said escapement member,
(h) means for moving said second support in said advancing direction when said retaining dogs engage said escapement member,
(i) means connected to said first and second support for mutually arresting same upon operation of said universal means, whereby said escapement member is caused to advance through a spacing corresponding to the sum of the retrograde movement of said first support and of the advancing movement of said second support,
(j) and means for moving said first support in said retrograde direction when said movable dogs engage said escapement member to back space same.

9. In a variable spacing mechanism for typewriters and like machines, the combination comprising:
(a) an escapement member having teeth spaced apart a plurality of unit intervals of spacing and being urged in an advancing direction, (b) a plurality of movable dogs normally engaged with said escapement member against said urge, (c) a first support for mounting said movable dogs for engagement with and disengagement from said escapement member, (d) means for variably moving said support in a retrograde direction when said movable dogs are disengaged from said escapement member, (e) a normally effective latch for preventing said first support from being so moved, (f) a plurality of retaining dogs for said escapement member, (g) a second support for mounting said retaining dogs for engagement with and disengagement from said escapement member, said retaining dogs being normally disengaged from said escapement member, (h) universal means operable for alternating said movable dogs and said retaining dogs in the engagement with said escapement member, said universal means, being further adapted to render said latch ineffective simultaneously with the disengagement of said movable dogs, (i) means for moving said second support in said advancing direction when said retaining dogs engage said escapement member, (j) means connected to said first and second support for mutually arresting same upon operation of said universal means, whereby said escapement member is caused to advance through a spacing corresponding to the sum of the retrograde movement of said first support and of the advancing movement of said second support, (k) and means for moving said latch in said retrograde direction and back to rest when latching said first support for causing said movable dogs to back space said escapement member.

10. In a variable spacing mechanism for typewriters and like machines, the combination comprising:

(a) an escapement member having teeth spaced apart a plurality of unit intervals of spacing and being urged in an advancing direction, (b) a plurality of movable dogs normally engaged with said escapement member against said urge, (c) a first support for mounting said movable dogs for engagement with and disengagement from said escapement member, (d) means for variably moving said support in a retrograde direction when said movable dogs are disengaged from said escapement member, (e) a normally effective latch for preventing said first support from being so moved, (f) a plurality of retaining dogs for said escapement member, (g) a second support for mounting said retaining dogs for engagement with and disengagement from said escapement member, said retaining dogs being normally disengaged from said escapement member, (h) universal means operable for alternating said movable dogs and said retaining dogs in the engagement with said escapement member, said universal means being further adapted to render said latch ineffective simultaneously with the disengagement of said movable dogs, (i) means for moving said second support in said advancing direction when said retaining dogs engage said escapement member, (j) means connected to said first and second support for mutually arresting same upon operation of said universal means, whereby said escapement member is caused to advance through a spacing corresponding to the sum of the retrograde movement of said first support and of the advancing movement of said second support, (k) means for moving said latch in said retrograde direction and back to rest when latching said first support, (l) and means operable subsequently to the movement of said latch for causing said retaining dogs to temporarily engage said escapement member and to prevent the movement of said second support, whereby said movable dogs are caused to engage said escapement member in a back spaced position when said latch is moved back to rest.

11. In a variable spacing mechanism for typewriters and like machines, the combination comprising:

(a) an escapement member having teeth spaced apart a plurality of unit intervals of spacing and being urged in an advancing direction, (b) a plurality of movable dogs normally engaged with said escapement member against said urge, (c) a first support for mounting said movable dogs for engagement with and disengagement from said escapement member, (d) means for variably moving said support in a retrograde direction when said movable dogs are disengaged from said escapement member, (e) a normally effective latch for preventing said first support from being so moved, (f) a plurality of retaining dogs for said escapement member, (g) a second support for mounting said retaining dogs for engagement with and disengagement from said escapement member, said retaining dogs being normally disengaged from said escapement member, (h) universal means operable for alternating said movable dogs and said retaining dogs in the engagement with said escapement member, said universal means being further adapted to render said latch ineffective simultaneously with the disengagement of said movable dogs, (i) means for moving said second support in said advancing direction when said retaining dogs engage said escapement member, (j) means connected to said first and second support for mutually arresting same upon operation of said universal means, whereby said escapement member is caused to advance through a spacing corresponding to the sum of the retrograde movement of said first support and of the advancing movement of said second support, (k) means operable for moving said latch in said retrograde direction and back to rest when latching said first support, (l) means operable subsequently to the movement of said latch for causing said retaining dogs to temporarily engage said escapement member and to prevent the movement of said second support, whereby said movable dogs are caused to engage said escapement member in a back spaced position when said latch is moved back to rest, (m) and a cyclically operating mechanism manually conditioned for power operating said means for moving said latch and said subsequently operable means.

12. In a variable spacing mechanism for typewriters and like machines, the combination comprising:

(a) an escapement member having teeth spaced apart a plurality of unit intervals of spacing and being urged in an advancing direction, (b) a plurality of movable dogs normally engaged with said escapement member against said urge, (c) a first support for mounting said movable dogs for engagement with and disengagement from said escapement member, (d) means conditionable for variably moving said support in a retrograde direction when said movable dogs are disengaged from said escapement member, (e) a normally effective latch for preventing said first support from being so moved.

(f) a numebr of elements each one presettable at the depression of an associated printing key for accordingly conditioning said conditionable means,
(g) a plurality of retaining dogs for said escapement member,
(h) a second support for mountaing said retaining dogs for engagement with and disengagement from said escapement member, said retaining dogs being normally disengaged from said escapement member,
(i) universal means operable for alternating said movable dogs and said retaining dogs in the engagement with said escapement member, said universal means being further adapted to render said latch ineffective simultaneously with the disengagement of said movable dogs,
(j) means for moving said second support in said advancing direction when said retaining dogs engage said escapement member,
(k) means connected to said first and second support for mutually arresting same upon operation of said universal means, whereby said escapement member is caused to advance through a spacing corresponding to the sum of the retrograde movement of said first support and of the advancing movement of said second support,
(l) means responsive to the simultaneous depression of more than one printing key for arresting said first and second support in predetermined positions irrespective of the preset elements of said number, whereby said escapement member is caused to advance through a constant stroke,
(m) and means for moving said latch in said retrograde direction and back to rest when latching said first support for causing said movable dogs to back space said escapement member through said constant stroke.

References Cited by the Examiner
UNITED STATES PATENTS

| | | | |
|---|---|---|---|
| 2,385,035 | 9/1945 | Smathers | 197—84.3 |
| 2,547,449 | 4/1951 | Dodge | 197—84.3 |
| 2,818,958 | 1/1958 | Toeppen et al. | 197—85 |
| 2,862,596 | 12/1958 | Toggenburger | 197—84.3 |
| 2,872,015 | 2/1959 | Toggenburger | 197—91 |
| 2,972,401 | 2/1961 | Salto | 197—84.3 |

ROBERT E. PULFREY, *Primary Examiner.*

E. T. WRIGHT, *Assistant Examiner.*